INVENTOR.
*Isamu Ohno*

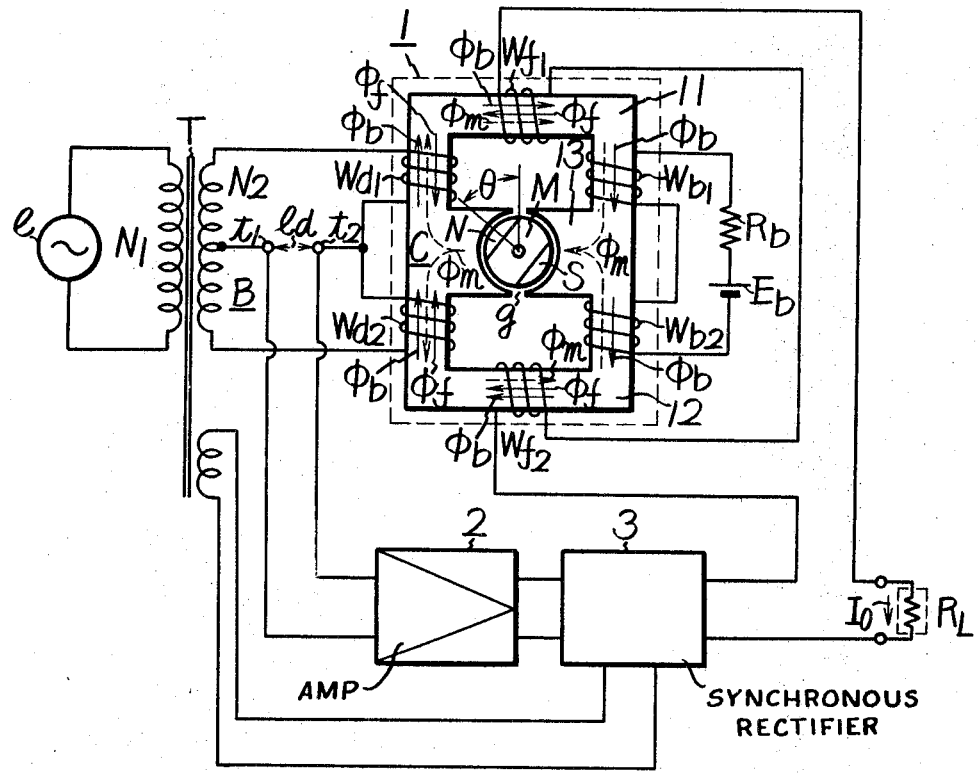

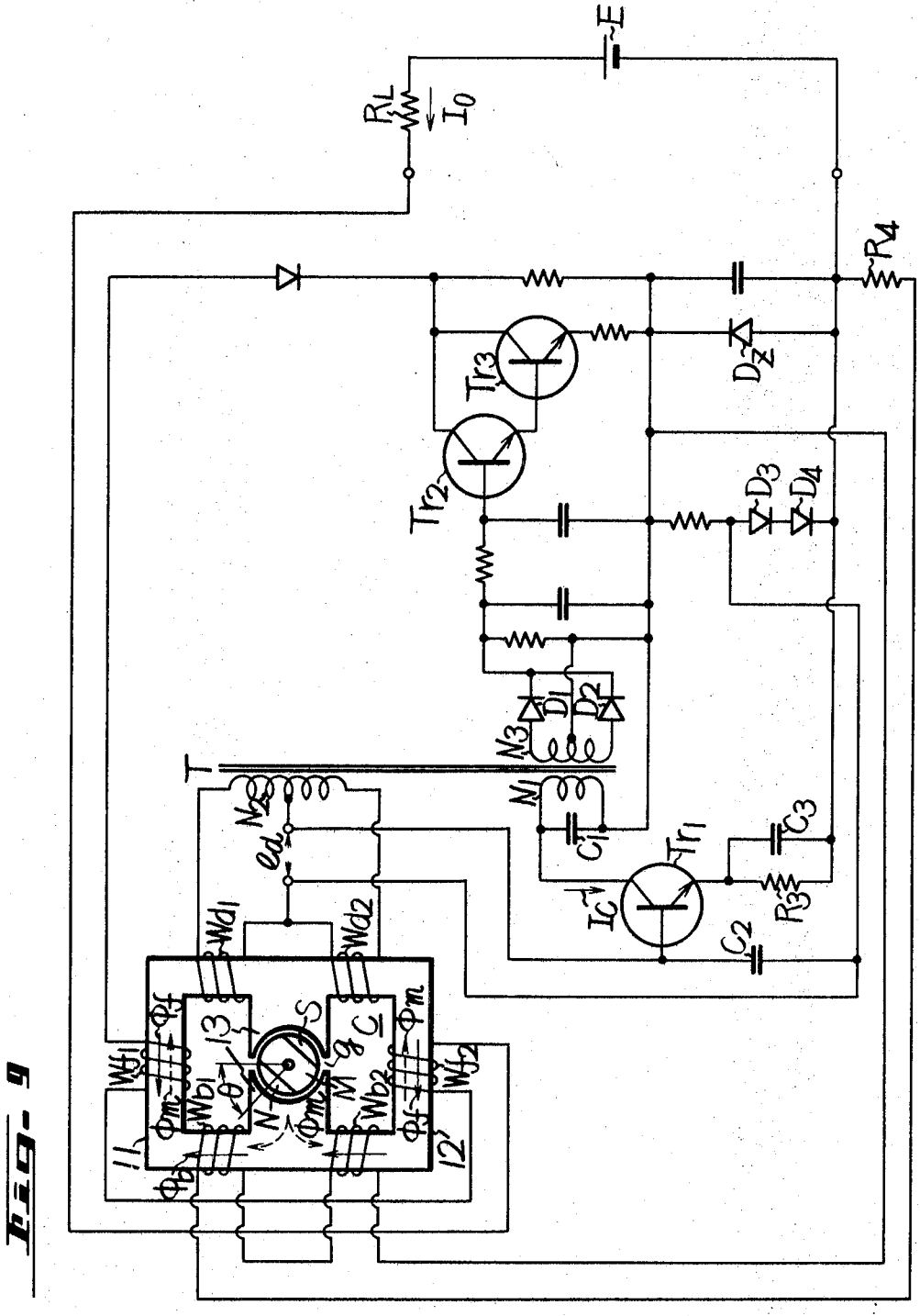

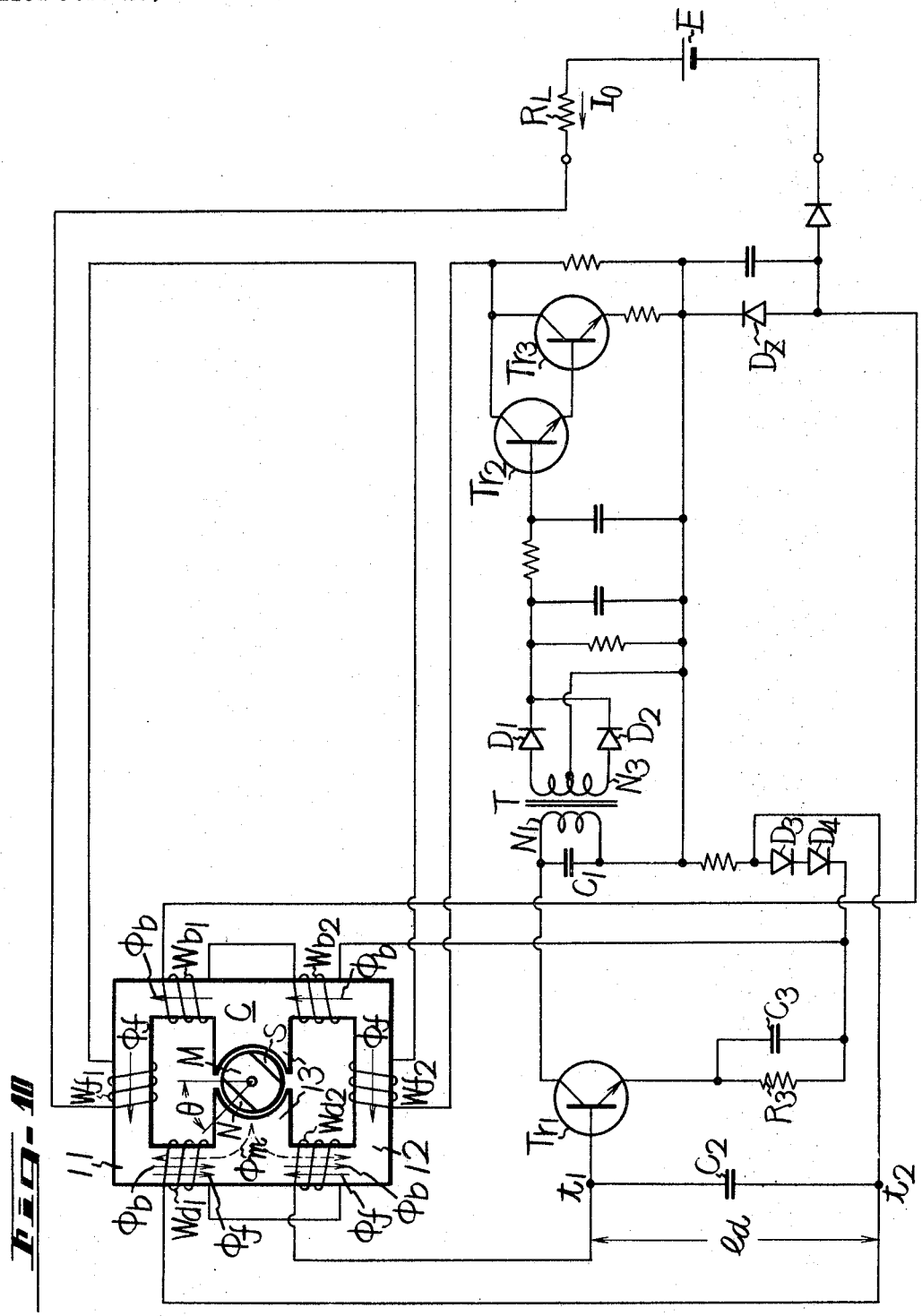

Aug. 11, 1970  ISAMU OHNO  3,524,177
ELECTROMECHANICAL TRANSDUCER
Filed Feb. 27, 1967  7 Sheets-Sheet 7
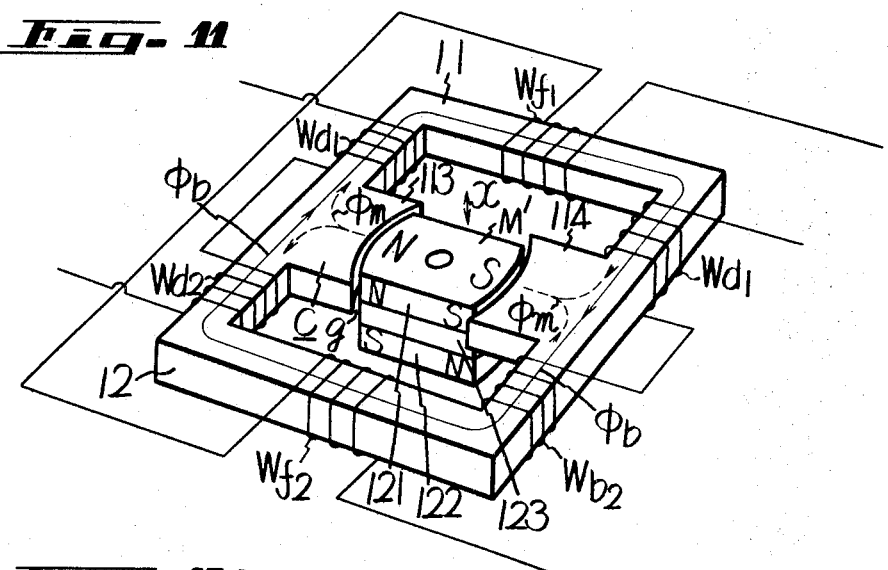
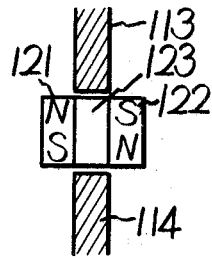 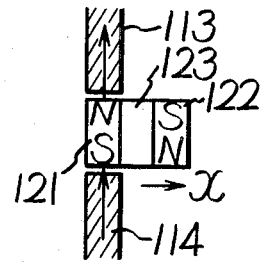 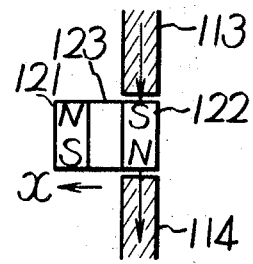
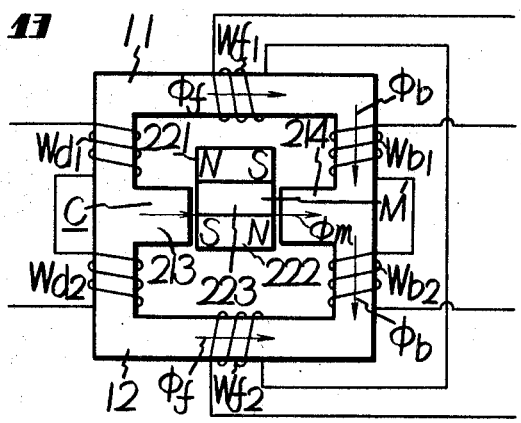
INVENTOR.
*Isamu Ohno*
BY *Hill, Sherman, Meroni, Gross & Simpson*  ATTORNEYS United States Patent Office 3,524,177
Patented Aug. 11, 1970

3,524,177
ELECTROMECHANICAL TRANSDUCER
Isamu Ohno, Musashino-shi, Tokyo, Japan, assignor to Kabushikikaisha Yokogawa Denki Seisakusho (Yokogawa Electric Works, Ltd.) Tokyo, Japan
Filed Feb. 27, 1967, Ser. No. 618,953
Claims priority, application Japan, Mar. 2, 1966, 41/12,679
Int. Cl. G08c *19/06;* H03b *5/12*
U.S. Cl. 340—186                8 Claims

ABSTRACT OF THE DISCLOSURE

An electromechanical transducer having a saturable magnetic core the magnetic permeability of which varies in accordance with displacement of a movable magnet disposed in the gap of the saturable magnetic core, an oscillation circuit controlled in response to the variations in the magnetic permeability of the saturable magnetic core and means for feeding back a DC current corresponding to the output of the oscillation circuit to the saturable magnetic core for balancing the magnetic flux produced by the feedback current with the magnetic flux produced by the movable magnet.

BACKGROUND OF THE INVENTION

Field of the invention

The present invention relates to an electromechanical transducer for transferring mechanical displacement to electric signals, and more particularly to an electromechanical transducer simple in construction, cheap in price and accurate in operation.

Description of the prior art

There are proposed electromechanical transducers comprising an electric power source, a high gain amplifier and a synchronous rectifier besides a magnetic core, a movable magnet and the like. Such electromechanical transducers encounter disadvantages that the size of the transducer becomes rather large and that the construction becomes complicated.

SUMMARY OF THE INVENTION

The present invention concerns with an electromechanical transducer which provides a novel electromechanical transducer small in size, simple in construction and accurate in operation. Furthermore, the electromechanical transducer of the present invention is capable of two-wires transmission system, which is never attained by the prior art.

BRIEF DESCRIPTION OF THE DRAWINGS

FIG. 3 is a graph showing the relationship between the magnetic permeability and magnetizing force in each magnetic path of the magnetic core;

FIGS. 9 and 10 connection diagrams illustrating other examples of this invention;

FIG. 11 is a perspective view chiefly illustrating the magnetic core and the movable member in still another example of this invention;

FIGS. 12A, 12B and 12C are schematic diagrams each showing the relationship between the position of the movable member and a magnetic flux produced in the magnetic path by the movable member in the device depicted in FIG. 11; and FIG. 13 is a plan view illustrating mainly the magnetic core and the movable member in a further example of this invention.

DESCRIPTION OF THE PREFERRED EMBODIMENTS

Figure 1:
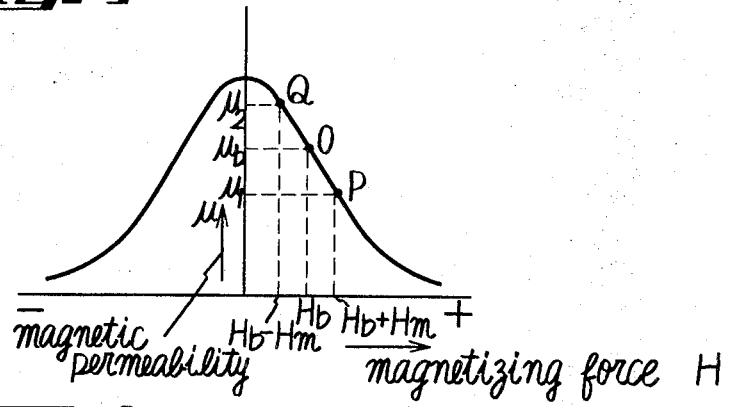
FIG. 1 is a connection diagram for explaining the main part of an electromechanical transducer of the present invention.

In FIG. 1 illustrating the main part of an electromechanical transducer, reference numeral 1 indicates a displacement detecting device utilizing magnetic saturation, which comprises a magnetic core C made of a saturable material of low hysteresis such, for example, as Permalloy and having a centrally disposed air gap $g$ of substantially circular shape in a common magnetic path 13, a disc-shaped permanent magnet M magnetized diametrically thereof and disposed rotatably in the air gap, and windings $W_{b1}$ and $W_{b2}$ each for establishing a bias magnetic field, the windings $W_{b1}$ and $W_{b2}$ being wound in series on magnetic paths 11 and 12 of the magnetic core C. These windings $W_{b1}$ and $W_{b2}$ are connected to a DC power source $E_b$, by which they are supplied with power, exciting the magnetic core C. Exciting of the windings $W_{b1}$ and $W_{b2}$ produces a magnetic flux $\phi_b$ indicated by full lines in the figure which circulates in the outer magnetic paths of the magnetic core C. The magnetic flux $\phi_b$ becomes cumulative with respect to a magnetic flux $\phi_m$ (indicated by broken lines in the figure) yielded by the magnet M in the magnetic path 11 and becomes differential with respect to the magnetic flux $\phi_m$ in the magnetic path 12. The magnitude of the magnetic flux $\phi_m$ varies with rotation of the rotary permanent magnet M. Accordingly, when the permanent magnet M rotates, for example, counterclockwise from the position indicated in the figure, the value of the magnetic flux $\phi_m$ increases for a little while. That is, in the magnetic path 11 all the magnetic fluxes increase with an increase in the rotation angle $\theta$ of the permanent magnet M, causing a decrease in the magnetic permeability $\mu_1$ of the magnetic path 11. Meanwhile, in the magnetic path 12 all the magnetic fluxes decrease, which in turn causes an increase in the magnetic permeability $\mu_2$ of the magnetic path 12. It is a matter of course that rotation of the permanent magnet M in a direction to reduce the magnitude of the magnetic flux $\phi_m$ causes a decrease in all the magnetic fluxes in the magnetic path 11 and an increase in all the magnetic fluxes in the magnetic path 12. Further, detecting windings $W_{d1}$ and $W_{d2}$ are wound in series on the magnetic paths 11 and 12 in the same number of turns and these windings $W_{d1}$ and $W_{d2}$ are connected to a secondary winding $N_2$ of a transformer T. A terminal $t_1$ is provided at the center of the secondary winding $N_2$ and a terminal $t_2$ is also provided at the connection point between the detecting windings $W_{d1}$ and $W_{d2}$, with the result that the secondary winding $N_2$ and the windings $W_{d1}$ and $W_{d2}$ constitute a detecting bridge B. In addition, a primary winding $N_1$ of the transformer T has connected thereto an AC power source $e$, and hence the detecting bridge B is supplied with an AC current. Since the inductances $L_{d1}$ and $L_{d2}$ of the windings $W_{d1}$ and $W_{d2}$ vary with the magnitudes of the magnetic permeabilities $\mu_1$ and $\mu_2$ of the magnetic paths 11 and 12, an unbalanced voltage $e_d$ is produced between the detecting terminals $t_1$ and $t_2$ of the detecting bridge B, which voltage $e_d$ depends upon the difference between the inductances $L_{d1}$ and $L_{d2}$ or upon the magnitude of the magnetic flux $\phi_m$ caused by the permanent magnet M, and in other words, upon the rotation angle of the permanent magnet M.

Figure 2:
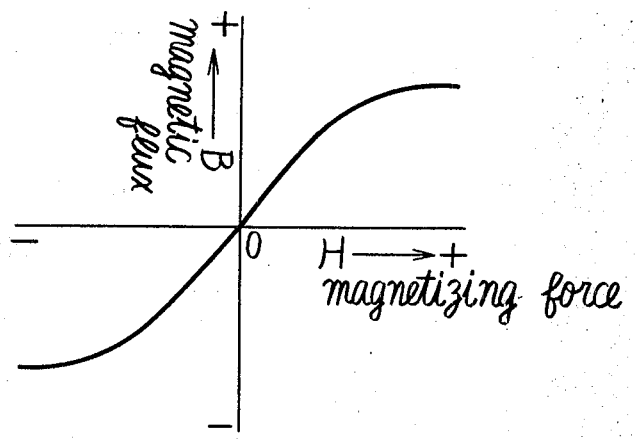
FIG. 2 is a graph showing the relationship between the magnetic flux density and magnetizing force of a magnetic core employed in the electromechanical transducer depicted in FIG. 1.
Figure 4:
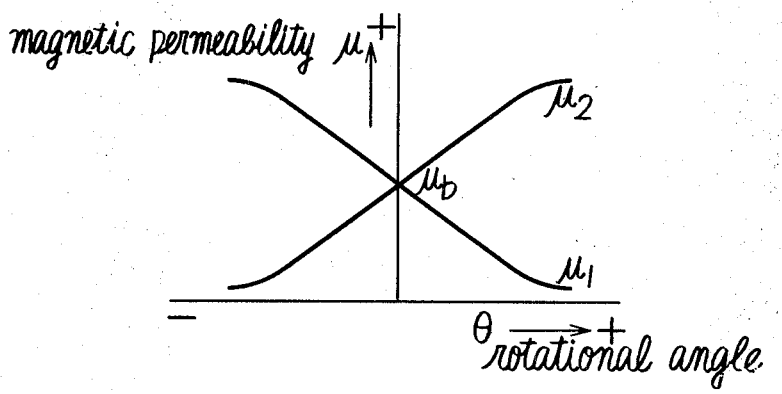
FIG. 4 is a graph showing the relationship between the rotational angle of a movable member and the magnetic permeability of the magnetic core.

A description will hereinafter be given in this connection in detail. The magnetic core C of the displacement detecting device 1 has such characteristics that as the magnetizing force H (represented by the abscissa) produced in each magnetic path of the core C increases, the magnetic flux density B (represented by the ordinate) becomes gradually saturated, as depicted in FIG. 2. Consequently, in this case the incremental permeability $\Delta\mu$ is given by the rate between infinitesimal variations $\Delta H$ in the magnetizing force H and those $\Delta B$ in the magnetic flux density B, namely by $\Delta B/\Delta H$, which is referred to as an effective magnetic permeability. The magnetic permeability, represented by the ordinate in FIG. 3, varies as depicted in the figure and uniformly decreases with an increase in the magnetizing force H represented by the abscissa while the magnetizing force H is positive. The magnetic core C is supplied with a bias magnetizing force $H_b$ (indicated by full line arrows in FIG. 5) circulating in the outer magnetic paths by the bias windings $W_{b1}$ and $W_{b2}$ through which a certain constant current $I_b$ flows. The magnetic permeabilities $\mu_1$ and $\mu_2$ of the respective magnetic paths 11 and 12 by the magnetic force $H_b$ are both $\mu_b$ which is a value on the ordinate corresponding to the point O in FIG. 3. Accordingly, the inductance $L_{d1}$ of the winding $W_{d1}$ wound on the magnetic path 11 and that $L_{d2}$ of the winding $W_{d2}$ wound on the magnetic path 12 are equal to each other. As a result of this, the detecting bridge B consisting of the windings $W_{d1}$ and $W_{d2}$ and the secondary winding $N_2$ of the transformer T is in equilibrium, and hence the unbalanced output $e_d$ is zero. Under such conditions, when the magnetizing force $H_m$ by the permanent magnet M is applied to the magnetic paths 11 and 12 as indicated by broken lines in FIG. 5, the bias magnetizing force $H_b$ and the magnetizing force $H_m$ due to the permanent magnet M become cumulative in the magnetic path 11 and the resulting value is given by $(H_b+H_m)$, and consequently the magnetic permeability $\mu_b$ is reduced to a value $\mu_1$ as indicated at the point P in FIG. 3, namely the magnetic permeability $\mu_b$ becomes decreased. Meanwhile, in the magnetic path 12 the bias magnetizing force $H_b$ and the magnetizing force $H_m$ by the permanent magnet M become differential with each other and accordingly the resulting value is given by $(H_b-H_m)$, and the magnetic permeability $\mu_b$ is raised to a value $\mu_2$ as indicated at the point Q in FIG. 3. That is, the magnetic permeabilities $\mu_1$ and $\mu_2$ of the magnetic paths 11 and 12 vary with the rotation angle $\theta$ of the permanent magnet M as depicted in FIG. 4, the abscissa representing the rotation angle $\theta$ and the ordinate the magnetic permeability $\mu$. As a result of this, there is produced between the detecting terminals $t_1$ and $t_2$ of the detecting bridge B an unbalanced voltage $e_d$ dependent upon the difference between the permeabilities $\mu_1$ and $\mu_2$ of the magnetic paths 11 and 12 or upon the rotation angle $\theta$ of the permanent magnet M. The voltage $e_d$ is at the same frequency as that of the power source $e$ and its phase varies with the magnetism of the magnetic flux $\phi_m$. The unbalanced voltage $e_d$ is amplified by an amplifier 2 and is then rectified to be of DC current by a synchronous rectifier 3, thereafter being applied to feedback windings $W_{f1}$ and $W_{f2}$. The feedback windings $W_{f1}$ and $W_{f2}$ are respectively wound on the magnetic paths 11 and 12 in such a sense as to produce a magnetic flux $\phi_f$ opposite in direction to the magnetic flux $\phi_m$ in each magnetic path, so that if the gain of the amplifier 2 is fully high, the magnetic fluxes $\phi_m$ and $\phi_f$ become balanced to apply to a load $R_L$ an output current corresponding to the rotation angle $\theta$ of the permanent magnet M.

However, the device of such a construction as above described requires a power source for the detecting bridge, a high-gain amplifier, a synchronous rectifier and so on, and hence the device becomes inevitably large and complicated in construction.

In order to eliminate such drawbacks encountered in the example in FIG. 1, it is considered to employ an oscillator circuit which is adapted such that its feedback value varies in accordance with the variations in the magnetic permeability of the magnetic core in response to displacement of the rotary magnet M to thereby control oscillation of the oscillator circuit, thus eliminating the above-mentioned drawbacks and providing an electro-mechanical transducer capable of operating as a two-wire transmission line. One embodiment of a transducer eliminating such drawbacks set forth above will hereinafter be described in detail with reference to the drawings.

Figure 5:
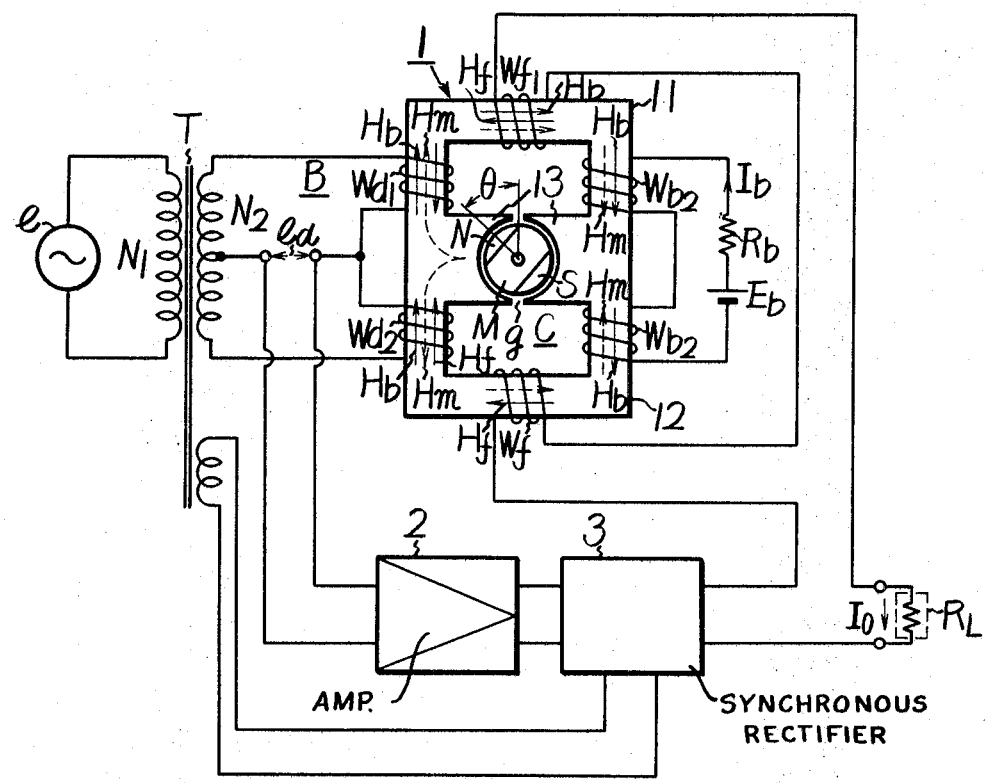
FIG. 5 is a connection diagram, similar to FIG. 1, for explaining the magnetizing force of each magnetic path of the magnetic core chiefly.
Figure 6:
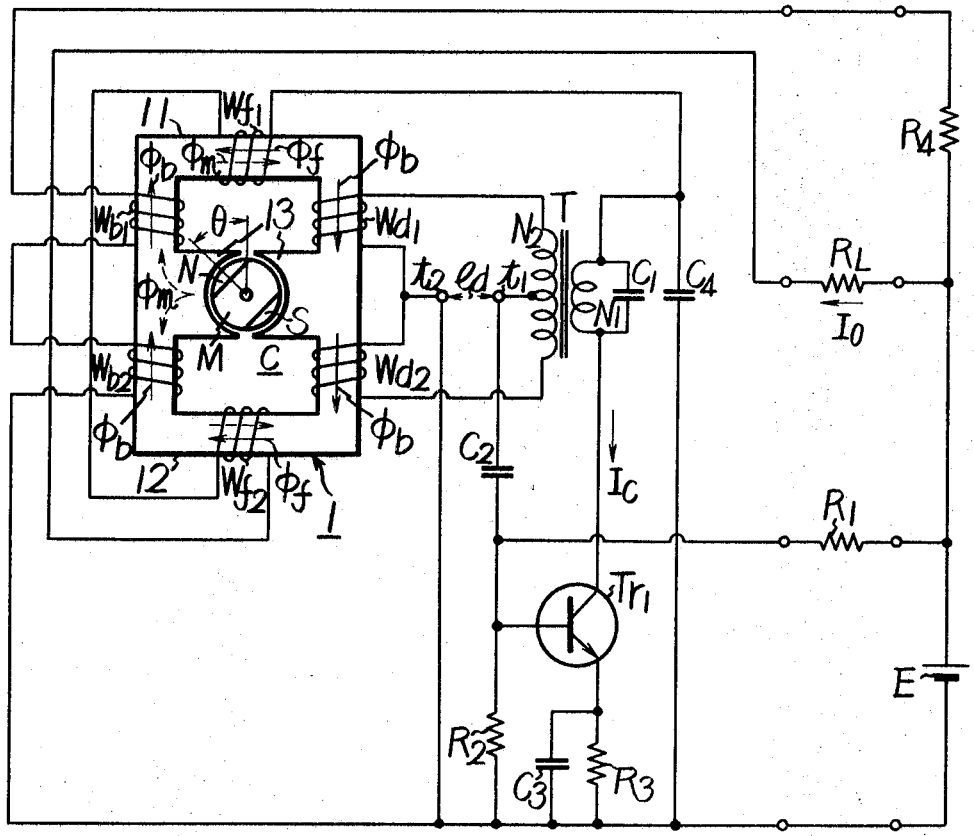
FIG. 6 is a connection diagram illustrating one example of a device of this invention.

FIG. 6 is a connection diagram illustrating one example of the displacement detecting device produced according to this invention, in which similar parts to those in FIGS. 1 and 5 are identified at similar reference numerals for the sake of brevity. Reference character $T_{r1}$ indicates an oscillation transistor, the base and emitter having connected therebetween detecting output terminals $t_1$ and $t_2$ of a detector 1, the collector having connected thereto feedback windings $W_{f1}$ and $W_{f2}$ through a tuning circuit of a primary winding $N_1$ of a transformer T and a capacitor $C_1$, and the emitter having connected thereto a parallel circuit of a capacitor $C_3$ and a resistor $R_3$. Reference characters $R_1$ and $R_2$ designate resistors for base bias. In addition, bias windings $W_{b1}$ and $W_{b2}$ are connected to a DC power source E through a resistor $R_4$.

Figure 7:
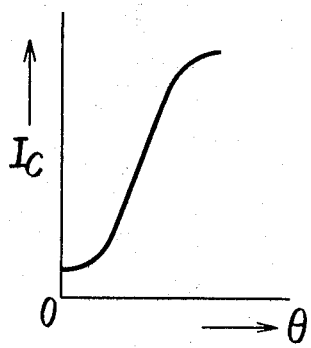
FIGS. 7 and 8 are graphs for explaining the operation of the device depicted in FIG. 6.
Figure 8:
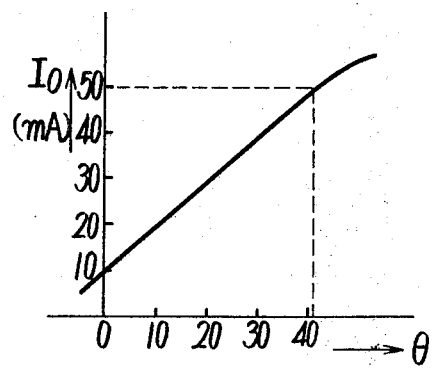

A description will be given in connection with the operation of the device constructed as above described. The oscillator circuit of the transistor $T_{r1}$ oscillates at a natural frequency determined by the winding $N_1$ and the capacitor $C_1$, and the oscillation amplitude can vary with a feedback voltage (an unbalanced voltage $e_d$) applied between the base and emitter of the transistor $T_{r1}$, namely the difference between the magnetic permeabilities of magnetic paths 11 and 12 of a magnetic core. Accordingly, the oscillation amplitude increases with an increase in the difference of the magnetic permeabilities, so that a DC component $I_c$ of the collector current also increases. Further, since the magnetic permeabilities of the magnetic paths 11 and 12 of the magnetic core vary with a rotation angle $\theta$ of the magnet M, the DC component $I_c$ of the oscillation output varies in response to the rotation angle $\theta$ of the magnet M, as depicted in FIG. 7, the ordinate representing the DC component $I_c$ and the abscissa the rotational angle $\theta$. The DC component $I_c$ of the oscillation output is applied to the feedback windings $W_{f1}$ and $W_{f2}$, and hence the oscillation of the oscillator circuit is controlled in such a manner that a magnetic flux $\phi_f$ due to the windings $W_{f1}$ and $W_{f2}$ become balanced with a magnetic flux $\phi_m$ due to the magnet M. Consequently, a DC output current $I_o$ can be obtained across a load $R_L$ which exactly corresponds to the rotation angle $\theta$ of the magnet M, as depicted in FIG. 8 in which the ordinate represents the DC component $I_o$ and the abscissa the rotational angle $\theta$.

While the foregoing has described the use of the DC component of the output of the oscillator circuit, the AC output of the oscillator circuit may also be used by the employment of such a circuit connection as shown in FIG. 9. In FIG. 9 the oscillation output is picked up by a tertiary winding $N_3$ of the transformer T and is then rectified by rectifiers $D_1$ and $D_2$, thereafter being DC-amplified by transistors $T_{r2}$ and $T_{r3}$, providing the output current $I_o$. Reference character $D_z$ identifies a constant-voltage Zener diode, and $D_3$ and $D_4$ bias diodes for the transistor $T_{r1}$. The device shown in FIG. 9 is an electromechanical transducer of two-wire transmission system which is designed to employ a power transmission line for supplying the detector with power and a signal transmission line for transmitting detected signals to the detector. In this device the voltage of the power source E may be, for instance, 24 v. and the signal current may be, for example, 10 to 15 ma. The foregoing has described the case in which the secondary winding $N_2$ of the transformer T and the detecting windings $W_{d1}$ and $W_{d2}$ constitute a bridge circuit to thereby detect unbalance of the magnetic permeabilities, but this should not be construed as limiting this invention specifically to the example illustrated in FIG. 9. The purpose can also be attained through the use of such a circuit construction as shown in FIG. 10. That is, in the example depicted in the figure the windings $W_{b1}$ and $W_{b2}$ are supplied with a current having superimposed DC and AC currents, such for example as the emitter or collector current of the transistor $T_{r1}$ to produce bias magnetic fields and exciting magnetic fields by the same windings. Further, the detecting windings $W_{d1}$ and $W_{d2}$ are differentially connected to each other and are connected to the base-emitter circuit of the transistor $T_{r1}$, causing the transistor $T_{r1}$ to start self-oscillation due to unbalance of the magnetic permeabilities resulting. In this case the secondary winding $N_2$ of the transformer T is left out, and the magnetic core may be, for example, ring-shaped or in various configurations without being limited to the one illustrated.

While this invention has been described in connection with the example where the rotational displacement of the rotary magnet is converted into an electrical signal, this invention is not limited specifically thereto. Referring now to FIG. 11 illustrating another example of the magnetic core and the permanent magnet, a description will be given in connection with a further example of this invention. The other elements are substantially the same as those in the foregoing examples, and hence neither illustration nor description will be given thereon.

In FIG. 11 reference character M′ indicates a movable member disposed in a central air gap $g$ formed in a common magnetic path 13 of a magnetic core C in such a manner that a magnetic field transversing the air gap $g$ is intersected by the movable member M′ in a vertical direction as indicated at $x$, the movable member being made up of permant magnets 121 and 122 with a spacer 123 held therebetween so that the magnets 121 and 122 may be opposite in polarity.

The following will describe the operation of the device illustrated with reference to FIG. 12. Where the movable member M′ assumes a position in the air gap $g$ of the magnetic core C, namely where the spacer 123 is opposite to magnetic poles 113 and 114 of the magnetic core C as depicted in FIG. 12A (this position will hereinafter be referred to as the reference position of the movable member M′), there is not produced in the magnetic core C a magnetic flux $\phi_m$ such as indicated by broken lines as shown in FIG. 11. Meanwhile, bias magnetic windings $W_{b1}$ and $W_{b2}$ are supplied with a DC current, so that a bias magnetic flux $\phi_b$ is produced in the magnetic core C which circulates in the outer magnetic paths thereof, as shown by full lines in FIG. 11. Then, where the movable member M′ is displaced from the reference position and assumes such a position that the permanent magnet 121 faces opposite to the magnetic poles 113 and 114 of the magnetic core C as shown in FIG. 12B, a magnetic flux $\phi_m$ produced from the movable member M′, which flux passes through the magnetic core C as indicated by arrows in FIG. 12B. As a result of this, there is yielded in the magnetic path 11 a magnetic flux which is the sum of the bias magnetic flux $\phi_b$ and that $\phi_m$ from the movable member M′, and the magnetic permeability $\mu_1$ of the magnetic path 11 decreases. Meanwhile, in the magnetic path 12 there is produced a magnetic flux which is the difference between the bias magnetic flux $\phi_b$ and that $\phi_m$ from the movable member M′, and hence the magnetic permeability $\mu_2$ of the magnetic path 12 increases. In addition, when the movable member M′ is displaced from the reference position in the direction opposite to that in FIG. 12B, as depicted in FIG. 12C, the direction of the magnetic flux $\phi_m$ in the magnetic core C is opposite to that in the foregoing. Consequently, all the magnetic fluxes in the magnetic path 11 decreases, and hence its magnetic permeability increases. In the magnetic path 12 all the magnetic fluxes increases and its magnetic permeability decreases. That is, an electrical signal can be obtained in response to the displacement of the movable member M′ in the direction identified at $x$ in the same manner as that described above.

FIG. 13 is a connection diagram, similar to FIG. 11, illustrating still another example of this invention. The example shown in FIG. 13 differs from that depicted in FIG. 11 in that a movable member M″ substantially similar to that in FIG. 11 is adapted such that a magnetic field produced in the gap $g$ of the magnetic core C can be displaced transversely of the gap $g$ in a direction parallel with respect to the paper, as indicated at $y$. In this case, the magnetic flux $\phi_m$ varies with the displacement of the movable member M″ in the direction $y$. Accordingly, an electrical signal can be obtained in response to the displacement of the movable member M″ in the direction $y$, as in the foregoing examples, especially in the example of FIG. 11.

In the foregoing examples, the feedback windings $W_{f1}$ and $W_{f2}$ are wound on the magnetic paths 11 and 12. It is, however, possible to wind the feedback windings on the common magnetic path 12 with the same effect as in the case of the foregoing.

It is also possible in the foregoing examples to form the rotary permanent magnet M by a rectangular permanent magnet having magnetic pieces repectively attached to the poles N and S thereof and to rotatably dispose the rectangular permanent magnet in the air gap $g$.

It will be apparent that many modifications and variations may be effected without departing from the scope of the novel concepts of this invention.

I claim as my invention:

1. An electromechanical transducer comprising a saturable magnetic core having formed therein an air gap, a movable magnet movably disposed in said air gap, the magnetic permeability of said saturable magnetic core varying in accordance with change of position of said movable magnet, an oscillator means, means for supplying the output of said oscillator means to said saturable magnetic core, and means for supplying the output of said saturable magnetic core to said oscillator means, such that the amplitude of said oscillation means is controlled in response to the change of the permeability of said saturable magnetic core.

2. An electromechanical transducer as claimed in claim 1, wherein said movable magnet is rotatably mounted in said air gap.

3. An electromechanical transducer as claimed in claim 1, wherein said movable magnet is slidably mounted in said air gap.

4. An electromechanical transducer as claimed in claim 1, further comprising means for feeding back a direct current component corresponding to the output of said oscillation means to said saturable magnetic core to thereby balance the magnetic flux in said saturable magnetic core due to said direct current component with the magnetic flux in said saturable magnetic core due to said magnet.

5. An electromechanical transducer comprising a magnetic detecting means having two magnetic paths, one portion of which is common with each other, an air gap formed in said common magnetic path portion, a permanent magnet mounted in said air gap, said magnetic detecting means having detecting windings, biasing windings and a feedback winding, an oscillator means having a tank circuit, a transformer having a primary winding forming the coil of said tank circuit and having secondary windings, and a bridge circuit consisting of said detecting windings and said secondary windings, the output terminals of said bridge circuit connected to the control circuit of said oscillator means, said feedback winding connected to the output circuit of said oscillator means and said bias windings being connected in series with a direct current source.

6. An electromechanical transducer comprising a magnetic detecting means having two saturable magnetic paths, one portion of which is common, an air gap formed in said common magnetic path portion, a permanent magnet disposed in said air gap, said permanent magnet being moved by means for moving said permanent magnet, said magnetic detecting means having detecting windings, biasing windings and feedback windings, an oscillator means having a tank circuit, a transformer having a primary winding forming the coil of said tank circuit, secondary windings and a tertiary winding, a bridge circuit consisting of said detecting windings and said secondary windings, the output terminals of said bridge circuit connected to the control circuit of said oscillator means, a rectifying circuit connected to said tertiary winding, a transistor amplifier circuit, the output side of which is connected in series with said feedback winding, a unidirectional device connected in series with said transistor amplifier so as to serve as a power source for said oscillator means, said biasing windings connected in series relation to said unidirectional device, a receiving side of the transducer having a direct current power source and a load located remotely from the detecting portion of said transducer, and a two-wire transmission line for transmitting a current from said direct current power source to said detecting part of said transducer.

7. An electromechanical transducer comprising a magnetic detecting means having two saturable magnetic paths one portion of which is common with each other, in said common magnetic path portion an air gap being formed, a permanent magnet movably mounted in said air gap, said magnetic means having detecting windings, biasing windings and a feedback winding, an oscillator means having a tank circuit, a transformer having a primary winding forming the coil of said tank circuit and having a secondary winding, said biasing windings being connected in series relation with the tank circuit of said oscillator means, said detecting windings being connected differentially with each other and to the control circuit of said oscillator means, a transistor amplifier circuit, the output side of which is connected in series with said feedback winding, a rectifying circuit connected to said secondary winding, said rectifying circuit being connected to the input side of said transistor amplifier, a unidirectional device connected in series with said transistor amplifier so as to serve as a power source for said oscillator means, a receiving side of the transducer having a direct current power source and a load located remotely from the detecting part of said transducer, and a two-wire transmission line for transmitting a current from said direct current power source to said detecting part of said transducer.

8. An electromechanical transducer as claimed in claim 1, wherein said oscillator means has a transistor, the output of said oscillator means being supplied to said saturable magnetic core, the emitter current of said transistor being a half-wave.

References Cited
UNITED STATES PATENTS

| | | | |
|---|---|---|---|
| 2,752,564 | 6/1956 | Ryerson | 340—197 X |
| 2,907,991 | 10/1959 | Van Allen. | |
| 3,305,770 | 2/1967 | Hulls | 340—197 X |

THOMAS B. HABECKER, Primary Examiner

C. M. MARMELSTEIN, Assistant Examiner

U.S. Cl. X.R.

331—117, 181; 340—197